(12) United States Patent
Beule et al.

(10) Patent No.: US 8,181,565 B2
(45) Date of Patent: May 22, 2012

(54) METHOD FOR MEASURING THE QUANTITY OF COFFEE DISPENSED BY A COFFEE MILL AND APPLIANCE COMPRISING SUCH A MILL

(75) Inventors: Mickaël Beule, Crouay (FR); Gilles Lebuffe, Conde sur Vire (FR)

(73) Assignee: SEB S.A., Ecully (FR)

( * ) Notice: Subject to any disclaimer, the term of this patent is extended or adjusted under 35 U.S.C. 154(b) by 936 days.

(21) Appl. No.: 12/201,814

(22) Filed: Aug. 29, 2008

(65) Prior Publication Data

US 2009/0056555 A1     Mar. 5, 2009

(30) Foreign Application Priority Data

Aug. 29, 2007 (FR) .................................... 07 06051

(51) Int. Cl.
*A47J 31/42* (2006.01)
*B67B 7/00* (2006.01)

(52) U.S. Cl. .................................. 99/286; 222/1; 73/861

(58) Field of Classification Search ..................... 99/286; 222/1; 73/861
See application file for complete search history.

(56) References Cited

FOREIGN PATENT DOCUMENTS

| WO | 2007027206 | * | 3/2007 |
| WO | 2007027206 A | | 3/2007 |
| WO | 2008001403 A | | 1/2008 |

* cited by examiner

*Primary Examiner* — Shawntina Fuqua
(74) *Attorney, Agent, or Firm* — Browdy and Neimark, PLLC

(57) ABSTRACT

A method for measuring a quantity of coffee $M_{Ni}$ or $M_{Ti}$ that a grinding burr of a coffee mill driven in rotation by a motor dispenses in a predetermined number of revolutions $N_i$ of the grinding burr or in a predetermined time interval $T_i$. According to the method: the average speed $V_i$ of the grinding burr in a number of revolutions $N_i$ or respectively in a time interval $T_i$ is measured; and the quantity or mass $M_{Ni}$ of coffee dispensed in the number of revolutions $N_i$ or respectively the mass $M_{Ti}$ of coffee dispensed in the time interval $T_i$ is deduced as a function of the speed $V_i$ from an experimentally obtained stored correspondence table $(V_i, M_{Ni})$ or $(V_i, M_{Ti})$.

13 Claims, 3 Drawing Sheets

METHOD FOR MEASURING THE QUANTITY OF COFFEE DISPENSED BY A COFFEE MILL AND APPLIANCE COMPRISING SUCH A MILL

BACKGROUND OF THE INVENTION

The present invention relates to the field of appliances for the preparation of coffee infusions, more particularly espresso-type appliances comprising a coffee bean mill.

It relates more particularly to a method for dispensing a dose of coffee by means of a grinding burr of a coffee mill driven in rotation by a motor.

In appliances of the aforementioned type, the method for dispensing a dose of coffee is based on counting the number of revolutions of the grinding burr of the coffee mill. An appliance comprising a coffee mill driven by an electric motor is known from the document FR 2648035. The method for dispensing a dose of coffee is based on the counting of the number of revolutions of the grinding burr by a sensor, which issues a command for shutting off the motor when a predetermined number of revolutions has been reached.

This known method for dispensing a dose of coffee is based on the hypothesis that the quantity of coffee produced per grinding burr revolution is identical no matter what the conditions under which the mill is used. In practice, however, the applicant has demonstrated that the quantity of coffee produced per grinding burr revolution varies substantially.

BRIEF SUMMARY OF THE INVENTION

The present invention provides a method for measuring a quantity of coffee dispensed and an appliance using such a method to repeatedly dispense a precise dose of coffee.

The invention further provides an appliance for the preparation of coffee infusions comprising a method for dispensing a dose of coffee by means of a grinding burr of a coffee mill that is simple and very economical to use.

To this end, the invention relates to a method for measuring a quantity of coffee $M_{Ni}$ or $M_{Ti}$ that a grinding burr of a coffee mill driven in rotation by a motor dispenses in a predetermined number of revolutions $N_i$ of the grinding burr or in a predetermined time interval $T_i$, characterized in that:
  the average speed $V_i$ of the grinding burr over a number of revolutions $N_i$ or respectively over a time interval $T_i$ is measured;
  the quantity or mass $M_{Ni}$ of coffee dispensed over the number of revolutions $N_i$ or respectively the mass $M_{Ti}$ of coffee dispensed over the time interval $T_i$ is deduced as a function of the speed $V_i$ from an experimentally obtained stored correspondence table $(V_i, M_{Ni})$ or $(V_i, M_{Ti})$.

This method has the advantage of precisely determining the quantity of ground coffee that a grinding burr of a coffee mill dispenses over a predetermined number of revolutions of the grinding burr or respectively over a predetermined time interval because, in a novel way, it takes into account the influence of the speed of the grinding burr on the quantity of coffee dispensed per grinding burr revolution or per time interval.

The invention also relates to a method for dispensing a dose of coffee wherein the quantity of coffee dispensed is measured by means of the above-described method, characterized in that:
  the grinding burr is run for a regular time interval $T_i$;
  the average speed Vi of the grinding burr is measured in a time interval $T_i$;
  the quantity or mass $M_i$ of coffee dispensed in the time interval $T_i$ is deduced from an experimentally obtained stored correspondence table $(V_i, M_i)$
  when the sum of the masses $M_i$ reaches a predetermined threshold Mo known as the expected dose or mass, the motor is shut off.

This method makes it possible to repeatedly dispense a precise dose of ground coffee because it takes into account the influence of the speed of the grinding burr on the quantity of coffee produced per time interval throughout the coffee dispensing cycle.

Another particular embodiment of the invention relates to a method for dispensing a dose of coffee by means of a grinding burr of a coffee mill driven in rotation by a motor, characterized in that:
  the grinding burr is run for a time $T_1$;
  the average speed $V_1$ is measured and then the mass $M_1$ of coffee by means of the first method described;
  from a predetermined dose Mo, the mass remaining to be dispensed $Mr=Mo-M_1$ is calculated;
  the remaining number of grinding burr revolutions Nr required to dispense the mass Mr, considering that the grinding burr will rotate at the speed $V_1$, is calculated from a stored correspondence table $(V_i, M_{Ti})$;
  the grinding burr is made to perform the remaining number of revolutions Nr.

This method is a simplified embodiment of the method described previously. At the start of the coffee dispensing cycle, the influence of the speed on the quantity produced is taken into account by measuring this speed, and the measured speed is considered to not change at the end of the cycle. This hypothesis was experimentally verified by the applicant This method allows for a simplified configuration of the control circuit of the coffee mill since it requires very little calculation.

Advantageously, the time $T_i$ is between half the expected time To for a coffee dispensing cycle and ⅞ of To, preferably ¾ of To.

This feature makes it possible to measure the speed in a major part of the coffee dose dispensing cycle and to thereby obtain a precise dose of ground coffee even if the speed is no longer measured at the end of the dispensing cycle.

Advantageously, the time interval $T_i$ is between 10 milliseconds and 100 milliseconds, preferably 20 milliseconds.

This 20-millisecond sampling is easy to perform because it corresponds to one cycle of the mains voltage at the power line frequency of 50 Hertz. If the standard power frequency is 60 Hertz, the time interval $T_i$ is preferably 16.666 milliseconds.

Furthermore, the invention also relates to an appliance for the preparation of coffee infusions comprising a coffee mill that dispenses a dose of coffee by means of the method that is the subject of the invention.

Such an appliance comprising a coffee mill having a grinding burr that dispenses a dose of coffee by means of the method that is the subject of the invention is capable of repeatedly delivering a precise dose of coffee.

Advantageously, the appliance includes a memory in which is stored an experimentally obtained table between the speed $V_i$ and the mass of coffee dispensed $M_{Ni}$ per number of revolutions $N_i$ or between the speed $V_i$ and the mass of coffee dispensed $M_{Ti}$ per time interval $T_i$.

This feature makes it possible to adapt the method for dispensing a dose of coffee to the characteristics of the grinding burr in order to obtain good precision in the dose delivered.

BRIEF DESCRIPTION OF THE DRAWINGS

The invention will be more clearly understood through the study of the embodiments taken as nonlimiting examples and illustrated in the attached figures, in which.

DETAILED DESCRIPTION OF THE INVENTION

Only the elements required for the comprehension of the invention have been illustrated.

The invention relates to a coffee-making appliance comprising a coffee mill. The mill has a grinding burr driven by a motor via a reduction gear having a reduction ratio of, for example, forty.

Figure 1:
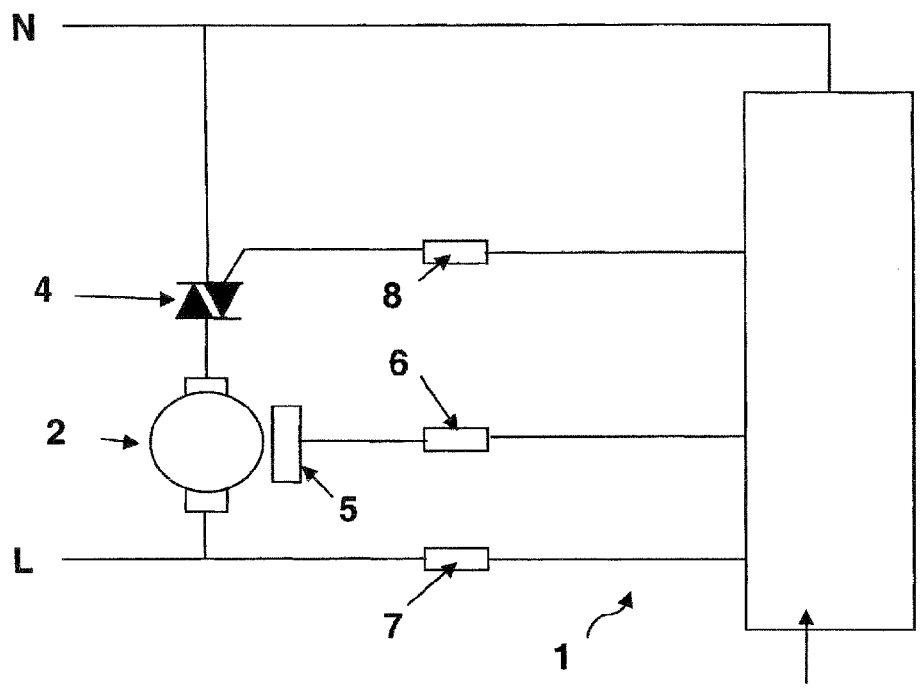
FIG. 1 is a schematic view of the control circuit of a motor driving the grinding burr of a coffee mill according to a particular embodiment of the invention.

FIG. 1 schematically represents a control circuit 1 of an alternating current-powered motor 2 that drives the grinding burr of a coffee mill. Said control circuit 1 includes a control element 4 for the motor 2 and a device 5 for counting the number of revolutions of the motor 2. Advantageously, the control element for the motor is a triac 4. The device 5 for counting the number of revolutions of the motor 2 is a sensor 5 but it could be a device of the type for measuring an electrical parameter of the motor that varies with the speed or of another type. The number of revolutions made by the motor 2 makes it possible, via the reduction ratio of the reduction gear, to deduce the number of revolutions made by the grinding burr.

The motor 2 and the control circuit 1 are subjected via two terminals L and N to an alternating supply voltage when the device is plugged in.

Embedded in the control circuit 1 is a microcontroller 3 containing a program for controlling the various functions of the appliance. The microcontroller 3 receives through inputs and transmits through outputs various information. Through an input 6, the microcontroller 3 receives, at regular intervals, a value of the number of revolutions made by the motor. The number of revolutions made by the motor 2 allows the microcontroller, via the reduction ratio of the reduction gear, to deduce the number of revolutions made by the grinding burr. Through another input 7, the microcontroller 3 receives the image of the supply voltage U, which enables said microcontroller to measure the value of the voltage and to define the instant at which the voltage is equal to zero, an instant known as the zero crossing. From an output 8, the microcontroller 3 controls the triac 4.

Figure 4:
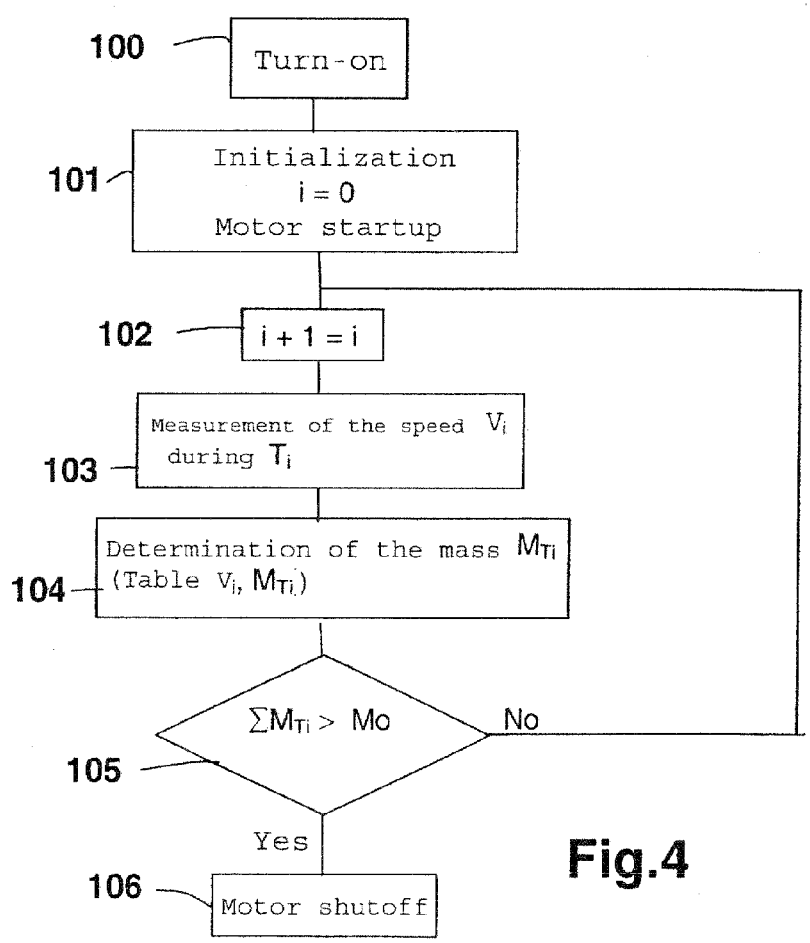
FIG. 4 illustrates an exemplary operating algorithm of the method for dispensing a dose of coffee according to a first embodiment of the invention.

FIG. 4 represents the series of steps that enable a coffee mill whose grinding burr is driven by a motor to dispense a dose of ground coffee, i.e. leading up to the point at which the grinding burr of the mill has dispensed a predetermined mass of coffee according to a first embodiment of the invention.

The first step 100 represented in the flow chart of FIG. 4 consists in turning on the coffee mill. In practice, to perform this step, the user operates a switch-type actuating mechanism that enables electric power to be supplied to the control circuit 1, after making sure that the container of the mill contains enough coffee beans.

The second step 101 is a step for initializing the program of the microcontroller 3. This step also comprises the resetting of a time counter included in the microcontroller 3. The time unit T of this counter is preferably 20 milliseconds, which corresponds to one cycle of the mains voltage at the power line frequency of 50 Hz. This counter is embodied by the microcontroller 3 with the aid of the input 7 that receives the image of the supply voltage. The zero crossing is the instant at which each new time unit $T_i$ starts, i being a subscript that is incremented at the start of each new time unit. During this step, the microcontroller 3 starts the motor 2 by actuating the triac 4 by means of its output 8.

Step 102 corresponds to the incrementing of the meter by the microcontroller 3 by means of the index i, which allows the time base to be clocked and allows the grinding cycle of the mill to proceed, time unit by time unit.

Step 103 is a step for measuring the speed $V_i$ per time unit $T_i$. Based on the information from the sensor 5 on the number of revolutions made by the motor, received through its input 6, the microcontroller 3 determines the speed $V_i$ of the grinding burr per time unit $T_i$.

Step 104 is a step for determining the mass $M_{Ti}$ delivered in the time interval $T_i$.

Figure 2:
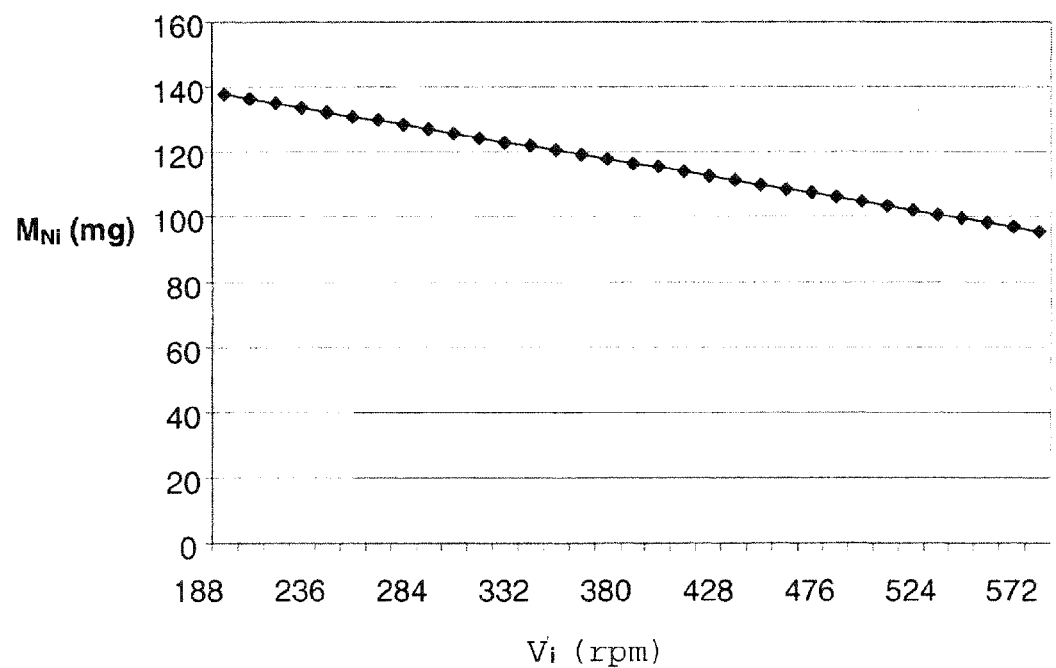
FIG. 2 illustrates an exemplary correspondence table of the quantity of coffee dispensed per grinding burr revolution as a function of the speed of the grinding burr of a coffee mill.

As described above, the applicant has demonstrated that the quantity of coffee produced per grinding burr revolution varies substantially as a function of the speed of the grinding burr and has experimentally established, as a function of a given type of grinding burr, a correspondence table of the quantity of coffee $M_{Ni}$ dispensed per grinding burr revolution, $N_i$, as a function of the speed $V_i$ of the grinding burr ($V_i$, $M_{Ni}$) (FIG. 2, where $N_i$=1 revolution).

Figure 3:
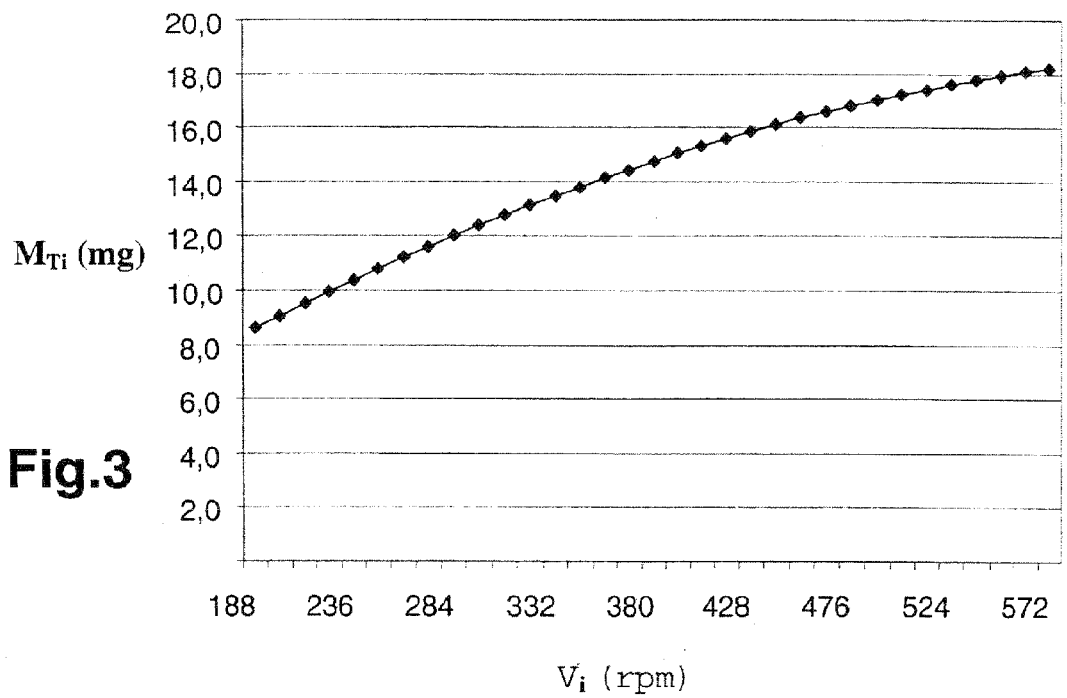
FIG. 3 illustrates an exemplary correspondence table of the quantity of coffee dispensed per 20-millisecond time interval as a function of the speed of the grinding burr of a coffee mill.

From this table is extrapolated the correspondence table of the quantity of coffee dispensed $M_{Ti}$ per predetermined time interval $T_i$ as a function of the speed $V_i$ of the grinding burr ($V_i$, $M_{Ti}$) (FIG. 3, where $T_i$=20 milliseconds, or $3.3 \times 10^{-4}$ minute). The relation linking $M_{Ni}$ and $M_{Ti}$ takes the form:

$$M_{Ti} = (M_{Ni} \times T_i \times V_i)/N_i,$$

where:

$T_i = 3.3 \times 10^{-4}$ minute, the time interval used to obtain the values for the curve of FIG. 3;

$V_i$ corresponds to the rate of rotation of the burr during the time interval $T_i$;

$N_i$ represents a predetermined number of revolutions of the burr, and is here equal to 1, which is used to obtain the values for the curve of FIG. 2;

$M_{Ni}$ is the quantity of coffee, in milligrams, dispensed per grinding burr revolution; and $M_{Ti}$, the quantity of coffee dispensed per predetermined time interval $T_i$.

To cite one example, if Vi=188 rpm and, from FIG. 2, $M_{Ni}$=140 mg, then $M_{Ti} = (140 \times 3.3 \times 10^{-4} \times 188)/1 = 8.7$ mg, as appears in FIG. 3.

The microcontroller 3 calculates, by means of a stored correspondence table ($V_i$, $M_{Ti}$), the mass $M_{Ti}$ delivered in the time interval $T_i$.

Step 105 is a test step for detecting the end of the coffee dose dispensing cycle. The microcontroller 3 includes a counter for calculating the sum of the masses $M_{Ti}$ and a stored value Mo corresponding to the expected mass of a dose of ground coffee. For example, Mo is equal to 7 grams.

The microcontroller compares the sum of the masses $M_{Ti}$ with the stored value Mo: If $\Sigma\ M_{Ti}$<Mo, the microcontroller returns to step 102. If $\Sigma\, M_{Ti} > Mo$, the mass Mo of a dose of coffee has been reached, and the microcontroller 3 issues a command for shutting off the motor 2 by means of its output 8.

Figure 5:
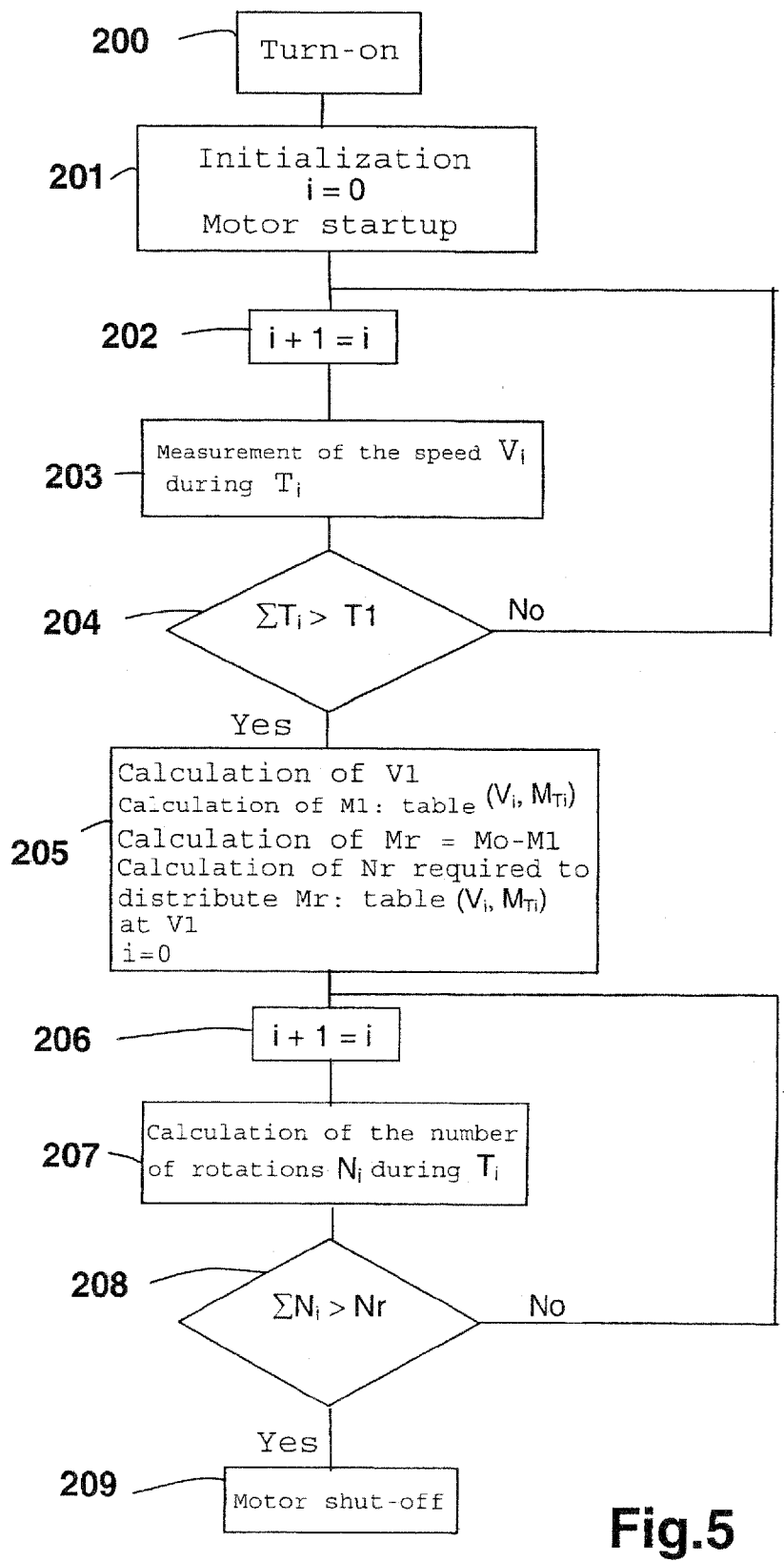
FIG. 5 illustrates an exemplary operating algorithm of the method for dispensing a dose of coffee according to a second embodiment of the invention.

FIG. 5 illustrates the series of steps that allow a coffee mill whose grinding burr is driven by a motor to dispense a dose of ground coffee according to a second embodiment of the invention.

Steps 200 (turning on the appliance), 201 (initialization and motor startup), 202 (incrementing of the meter) and 203 (measurement of the speed $V_i$) are identical to steps 100, 101, 102 and 103 described above.

Step 204 is a test step for detecting the elapse of a stored time T1. The time T1 is a fraction of the expected time To for completing a ground coffee dispensing cycle; for example, T1=¾ To=4 seconds. The time T1 must be sufficiently long, but shorter than a minimum time required to complete a ground coffee dispensing cycle, i.e. a time reached under maximum speed conditions.

The microcontroller 3 includes a counter that makes it possible to calculate the sum of the times $T_i$. The microcontroller 3 compares the sum of the times $T_i$ with the stored value T1. If $\Sigma\, T_i < T1$, the microcontroller 3 returns to step 202. If $\Sigma\, T_i > T1$, the time T1 has elapsed, and the microcontroller 3 proceeds to step 205.

Step 205 is a step for calculating the number of revolutions remaining to be made by the grinding burr after the time T1 in order to dispense the expected mass Mo of a dose of ground coffee.

First, the microcontroller 3 determines the speed V1 of the grinding burr in the time T1 based on the information from the sensor 5 on the number of revolutions made by the motor, received through the input 6.

Next, the microcontroller 3 calculates by means of the stored correspondence table $(V_i, M_{Ti})$ the mass of coffee M1 delivered in the time interval T1.

Then, the microcontroller 3 calculates the mass Mr of coffee remaining to be dispensed in order to reach the expected mass Mo of a dose of coffee: Mr=Mo−M1. To finish, the microcontroller 3 determines the number of revolutions Nr remaining to be made in order to dispense the mass Mr by means of the stored correspondence table $(V_i, M_{Ni})$, considering Vi to be equal to V1 at the end of the coffee dispensing cycle.

The microcontroller 3 initializes the index i and executes step 206, which is identical to step 202.

Step 207 is a step for calculating the number of revolutions $N_i$ in a time interval $T_i$. The microcontroller 3 performs this calculation based on the information from the sensor 5 on the number of revolutions made by the motor, received through the input 6.

Step 208 is a test step for detecting the end of the coffee dose dispensing cycle. The microcontroller 3 includes a meter for calculating the sum of the numbers of revolutions Ni.

The microcontroller compares the sum of the numbers of revolutions Ni with the stored value Nr of the number of revolutions remaining to be made. If $\Sigma\, Ni < Nr$, the microcontroller returns to step 206. If $\Sigma\, Ni > Nr$, the number of revolutions of the grinding burr required to complete the dispensing of a dose of coffee has been reached, and the microcontroller 3 proceeds to step 209, issuing a command for shutting off the motor 2 by means of its output 8.

It is understood that the invention is not in any way limited to the embodiments described and illustrated, which are given only by way of example. Other modifications remain possible, particularly from the point of view of the composition of the various elements or the substitution of technical equivalents, without going beyond the scope of protection of the invention.

What is claimed is:

1. A method for measuring a quantity of coffee $M_{Ni}$ or $M_{Ti}$ that a grinding burr of a coffee mill driven in rotation by a motor dispenses in a predetermined number of revolutions $N_i$ of the grinding burr or in a predetermined time interval $T_i$, said method comprising:
   applying a supply voltage to the motor in order to drive the motor and the burr in rotation;
   providing a sensor for counting the number of revolutions of the motor for producing a signal indicating the speed of the motor;
   determining, on the basis of the signal from the sensor, the average speed $V_i$ of the grinding burr over a number of revolutions $N_i$ or respectively over the time interval $T_i$; and
   determining the quantity or mass $M_{Ni}$ of coffee dispensed during the number of revolutions $N_i$ or respectively the mass $M_{Ti}$ of coffee dispensed during the time interval $T_i$ as a function of the speed $V_i$ from an experimentally obtained stored correspondence table $(V_i, M_{Ni})$ or $(V_i, M_{Ti})$.

2. The method for dispensing a dose of coffee wherein the quantity of coffee dispensed is measured by means of the method according to claim 1, wherein:
   the grinding burr is driven in rotation for the time interval $T_i$;
   said step of determining the average speed comprises measuring the average speed Vi of the grinding burr during the time interval $T_i$;
   said step of determining the quantity or mass of coffee comprises determining the quantity or mass of coffee dispensed during the time interval $T_i$ from the experimentally obtained stored correspondence table $(V_i, M_i)$; and
   said method further comprises shutting the motor off when the sum of the masses reaches a predetermined threshold Mo, which is the expected dose or mass.

3. A method for dispensing a dose of coffee by means of a grinding burr of a coffee mill driven in rotation by a motor, comprising:
   causing the grinding burr is rotate for a time $T_1$;
   applying a supply voltage to the motor in order to drive the motor and the burr in rotation;
   measuring the average speed $V_i$ of the grinding burr over a number of revolutions $N_i$ or respectively over the time interval $T_i$;
   determining the quantity or mass $M_{Ni}$ of coffee dispensed during the number of revolutions $N_i$ or respectively the mass $M_{Ti}$ of coffee dispensed during the time interval $T_i$ as a function of the speed $V_i$ from an experimentally obtained stored correspondence table $(V_i, M_{Ni})$ or $(V_i, (M_{Ti})$;
   from a predetermined coffee dose Mo, calculating the mass remaining to be dispensed Mr=Mo−M$_1$;
   calculating the remaining number of grinding burr revolutions Nr required to dispense the mass Mr, considering that the grinding burr will rotate at the speed $V_1$, from a stored correspondence table $(V_i, M_{Ti})$; and
   causing the grinding burr to perform the remaining number of revolutions Nr.

4. The method according to claim 3, wherein the time $T_i$ is between half an expected time To for a coffee dispensing cycle and ⅞ of To.

5. The method according to claim 4, wherein $T_i$ is ¾ of To.

6. The method according to claim 4, wherein the time interval $T_i$ is between 10 milliseconds and 100 milliseconds.

7. The method according to claim 6, wherein the time interval $T_i$ is 16⅔ milliseconds or 20 milliseconds.

8. The method according to claim 1, wherein the time interval $T_i$ is between 10 milliseconds and 100 milliseconds.

9. The method according to claim 8, wherein the time interval $T_i$ is 16⅔ milliseconds or 20 milliseconds.

10. An appliance for the preparation of coffee infusions comprising a coffee mill and means for causing that mill to dispense a dose of coffee according to the method of claim 2.

11. An appliance according to claim 10, further comprising a memory in which is stored an experimentally obtained table between the speed $V_i$ and the mass of coffee dispensed $M_{Ni}$ per number of revolutions $N_i$ or between the speed $V_i$ and the mass of coffee dispensed $M_{Ti}$ per time interval $T_i$.

12. An appliance for the preparation of coffee infusions comprising a coffee mill and means for causing that mill to dispense a dose of coffee according to the method of claim 3.

13. An appliance according to claim 12, further comprising a memory in which is stored an experimentally obtained table between the speed $V_i$ and the mass of coffee dispensed $M_{Ni}$ per number of revolutions $N_i$ or between the speed $V_i$ and the mass of coffee dispensed $M_{Ti}$ per time interval $T_i$.

* * * * *